United States Patent [19]
Tsuda et al.

[11] Patent Number: 5,482,506
[45] Date of Patent: Jan. 9, 1996

[54] AIR-CONDITIONING BLOW-OUT PORT DEVICE AND PROCESS FOR TWO-STAGE INJECTION MOLDING OF THE SAME

[75] Inventors: Kazuhiko Tsuda; Hiroyuki Okamoto; Kazuhiro Hashimoto, Kawagoe, all of Japan

[73] Assignee: Moriroku Kabushiki Kaisha, Tokyo, Japan

[21] Appl. No.: 350,125

[22] Filed: Nov. 29, 1994

[30] Foreign Application Priority Data

Nov. 30, 1993 [JP] Japan ............................. 5-299425

[51] Int. Cl.⁶ ............................................. B60H 1/34
[52] U.S. Cl. ................................... 454/155; 454/315
[58] Field of Search ................................... 454/109, 155, 454/313, 315, 319, 318

[56] References Cited

U.S. PATENT DOCUMENTS 4,414,170  11/1983  Sano ............................ 454/155 X
5,340,357   8/1994  Nagai et al. ...................... 454/155

FOREIGN PATENT DOCUMENTS 128059  6/1986  Japan ............................. 454/155

Primary Examiner—Harold Joyce
Attorney, Agent, or Firm—Armstrong, Westerman, Hattori, McLeland & Naughton

[57] ABSTRACT

An air conditioning blow-out port device includes a housing of a synthetic resin having pairs of shaft holes provided in a coaxial arrangement in opposite wall portions of a peripheral wall to extend through the opposed wall portions, and a plurality of blades each having a pair of support shafts which are projectingly provided coaxially on opposite end faces of each of blade bodies disposed within the housing. The support shafts are rotatably fitted into shaft holes, with each of tip ends thereof projecting from an outer surface of each of the opposed wall portions. A plurality of pairs of bosses are provided on the opposed wall portions and located coaxially with the shaft holes to define inlet openings of the shaft holes at sides of inner surfaces of the opposed wall portions and to abut against opposite end faces of the blade bodies. A plurality of pairs of recesses are provided in the opposed wall portions and located coaxially with the shaft holes. These recesses open into outer surfaces of the opposed wall portions to surround inlet openings of the shaft holes at sides of the outer surfaces of the opposed wall portions.

5 Claims, 14 Drawing Sheets

AIR-CONDITIONING BLOW-OUT PORT DEVICE AND PROCESS FOR TWO-STAGE INJECTION MOLDING OF THE SAME

BACKGROUND OF THE INVENTION

1. Field of the Invention

The present invention relates to an air conditioning blow-out port device mounted in an instrument panel or the like in a vehicle, and a process for producing the same by a two-stage injection molding.

2. Description of the Prior Art

There is such a conventionally known air conditioning blow-out port device which includes a housing having a plurality of pairs of shaft holes provided in a coaxial arrangement in opposed wall portions of a peripheral wall thereof to extend through the opposed wall portions, and a plurality of blades each having a pair of support shafts which are projectingly provided coaxially on opposite end faces of a blade body and rotatably fitted into the shaft holes, each of tip ends of the support shaft projecting from an outer surface of each of the opposed wall portions. The reason why the tip end of each support shaft projects from the outer surface of corresponding one of the opposed wall portions is that the support shaft is formed long enough to reliably prevent the disengagement of the blade from the housing.

In this case, in order to smoothly rotate the blades, it is necessary to reduce the rotational resistance of each blade with respect to the housing to the utmost.

The above-described air conditioning blow-out port device is produced using a synthetic resin by a two-stage injection molding process which includes a primary injection step of molding a housing and a secondary injection step of molding blades by forming support shaft molding cavities by shaft holes in the housing and blind holes located in slide dies to communicate with the shaft holes.

However, the prior art process has a problem in that mating faces of the slide dies and the housing are located in the support shaft molding cavities in proximity to bottom surfaces of the blind holes and for this reason, a pressure in the blind hole at a side of its bottom surface becomes high and hence, a molten synthetic resin is squeezed out into a gap between the mating faces, and as a result, flashes are formed on an outer peripheral surface of each support shaft which causes the rotation of the blade to be defective in smoothness.

SUMMARY OF THE INVENTION

Accordingly, it is an object of the present invention to provide an air conditioning blow-out port device of the type described above, wherein each of the blades can be rotated smoothly.

To achieve the above object, according to the present invention, there is provided an air conditioning blow-out port device comprising: a housing of synthetic resin having a peripheral wall including opposed wall portions; a plurality of pairs of shaft holes passed through the opposed wall portions in a coaxial arrangement; and a plurality of blades of synthetic resin each having a pair of support shafts which are projectingly provided coaxially on opposite end faces of each of blade bodies disposed within the housing and which are rotatably fitted into the shaft holes, with each of tip ends thereof projecting from an outer surface of each of the opposed wall portions, wherein the opposed wall portions are provided with a plurality of pairs of bosses, which are located coaxially with the shaft holes to define inlet openings of the shaft holes at sides of inner surfaces of the opposed wall portions and to abut against the opposite end faces of the blade bodies, and the opposed wall portions are also provided with a plurality of pairs of recesses, which are located coaxially with the shaft holes and which open into outer surfaces of the opposed wall portions to surround inlet openings of the shaft holes at sides of the outer surfaces of the opposed wall portions.

With the above arrangement, it is possible to decrease the contact area between each of the blades and the housing by virtue of each of the bosses to reduce the rotational resistance of each blade, thereby enabling a smooth rotation of each blade. Moreover, it is possible to avoid an increase in thickness of the opposed wall portions due to the provision of bosses by virtue of the recesses to prevent a deformation of the shaft hole due to a delay of cooling of a portion around each of the bosses during molding.

It is another object of the present invention to provide a process for two stage injection molding of an air conditioning blow-out port device of the type described above, wherein the production of flashes on the outer peripheral surfaces of the support shafts can be inhibited by employment of a simple means.

To achieve the above object, according to the present invention, there is provided a process for producing an air conditioning blow-out port device in a two-stage injection molding manner using a synthetic resin, the air conditioning blow-out port device comprising: a housing of synthetic resin having a plurality of pairs of shaft holes provided in a coaxial arrangement in opposite wall portions of a peripheral wall to extend through the opposed wall portions, and a plurality of pairs of bosses located coaxially with the shaft holes to define inlet openings of the shaft holes at sides of inner surfaces of the opposed wall portions; and a plurality of blades each having a blade body disposed within the housing with opposite end faces thereof abutting against the bosses, respectively, and a pair of support shafts which are projectingly provided coaxially on the opposite end faces of each of the blade bodies and which are rotatably fitted into shaft holes with each of tip ends thereof projecting from an outer surface of each of the opposed wall portions; the process comprising the steps of: closing first and second opposed opening-closing dies, while at the same time, clamping between both the opening-closing dies a plurality of first opposed slide dies including a plurality of shaft hole shaping cores and a plurality of projections each having the core projectingly provided on a portion of an end face thereof, thereby defining a cavity for molding the housing such that the shaft hole shaping cores and the projections are included; primarily injecting a synthetic resin into the cavity to mold the housing which includes a plurality of recesses shaped by the projections to open into the outer surfaces of the opposed wall portions and to surround inlet openings of the shaft holes at sides of the outer surfaces of the opposed wall portions; closing third and fourth opening-closing dies to clamp the housing by the third and fourth opening-closing dies, and to clamp between the third and fourth opening-closing dies a plurality of second slide dies opposed to one another in a manner to fit the projections into the recesses and to put blind holes opening into the end faces of the projections into communication with the shaft holes, thereby defining a plurality of first cavities which mold the support shafts by the blind holes and the shaft holes communicating with the blind holes, while at same time, defining a plurality of second cavities for which mold the blade bodies between the first opposed cavities; and secondarily injecting a synthetic resin into the first and second cavities to mold the blades.

In each of the cavities for molding the support shafts, mating faces of the second slide die and the housing are the end face of the projection of the second slide die and the bottom surface of the recess of the housing. Therefore, the distance a between the mating faces and the bottom surface of the blind hole is determined by a= b+ c, wherein b represents the distance in the prior art device having no recess, and c represents a depth of the recess. Consequently, at the second injection step, a pressure of the molten synthetic resin applied to the mating faces is lower than that in the prior art process and therefore, the production of flashes on the outer peripheral surface of the support shafts can be inhibited.

In this manner, the air conditioning blow-out port device having the smoothly rotatable blades can be mass-produced by employing a simple means that the mating faces are located at a larger distance from the bottom surfaces of the blind holes.

The above and other objects, features and advantages of the invention will become apparent from the following description of preferred embodiments taken in conjunction with the accompanying drawings.

DESCRIPTION OF THE PREFERRED EMBODIMENT

Figure 1:
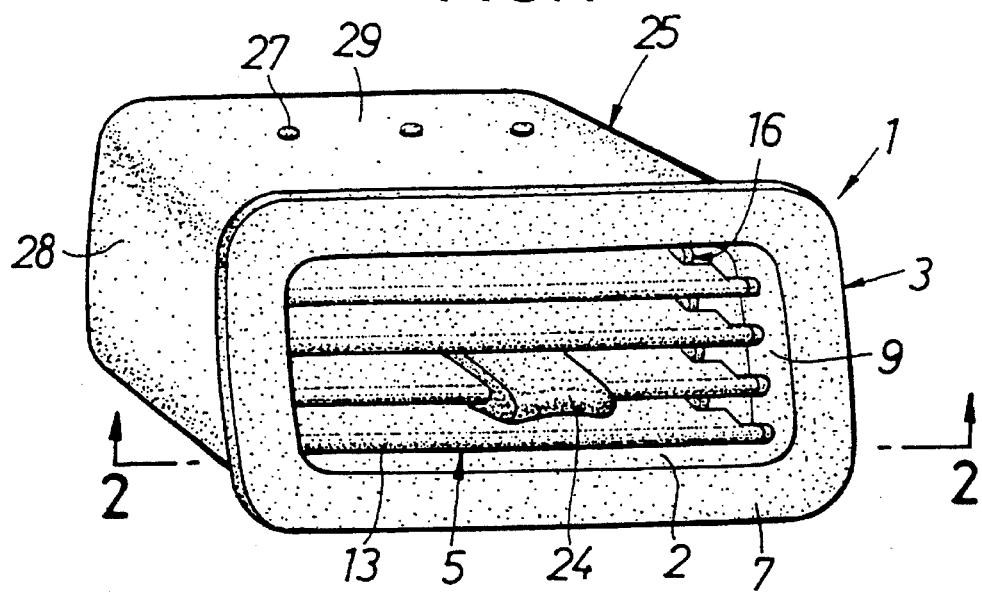
FIG. 1 is a perspective view illustrating a preferred embodiment of an air conditioning blow-out port device.
Figure 2:
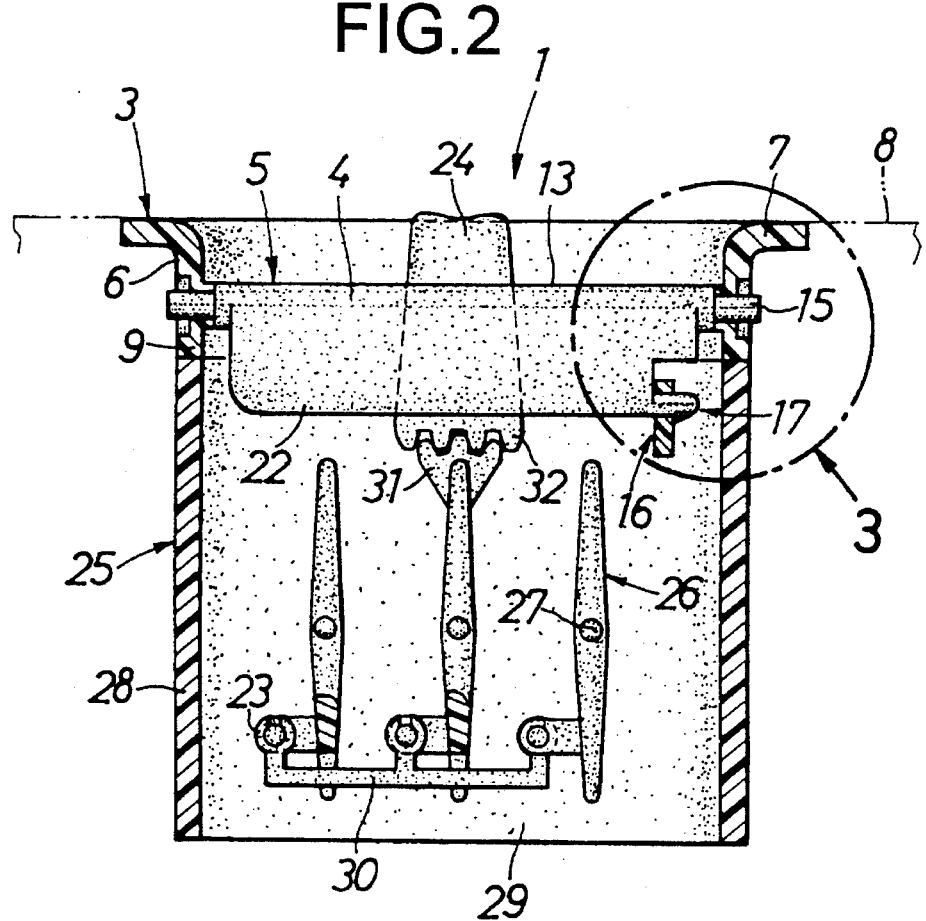
FIG. 2 is a sectional view taken along a line 2—2 in FIG. 2.

FIGS. 1 to 5 illustrate an embodiment of an air-conditioning blow-out port device 1 made in a two-stage molding process. The device 1 is constructed from a synthetic resin housing 3 having a substantially rectangular blow-out hole 2, and a plurality of synthetic resin blades 5 having blade bodies 4 disposed within the housing 3 for adjusting the vertical direction of wind, as best shown in FIGS. 1 and 2. The housing 3 has a front flange 7 at a front end of a peripheral wall 6 thereof. The housing 3 is embedded in an instrument panel 8 of a vehicle such that a front surface of the front flange is matched with a surface of the instrument panel 8.

Figure 3:
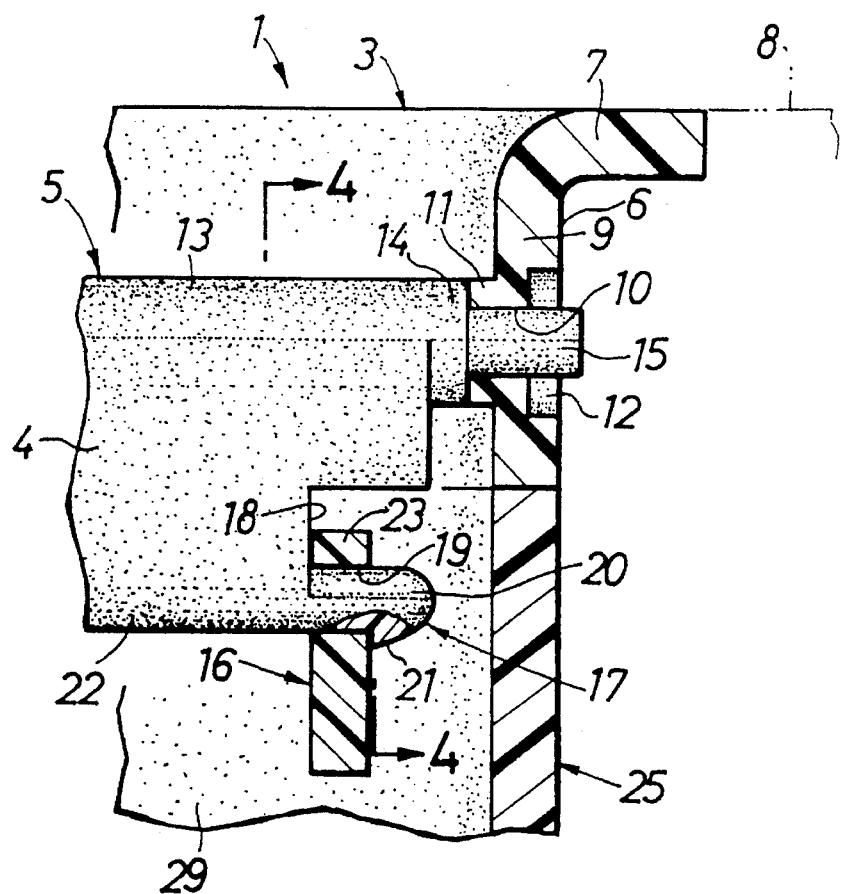
FIG. 3 is an enlarged view taken along an arrow 3 in FIG. 2.

As best shown in FIGS. 2 and 3, provided in both left and right opposed wall portions 9 of the peripheral wall 6 of the housing 3 are pairs of shaft holes 10 coaxially arranged to extend through the opposed wall portions and pairs of bosses 11 circular in section, which are located coaxially with the shaft holes 10 and which define inlet openings of the shaft holes 10 on the side of inner surfaces of the opposed wall portions 9. Plural pairs of circular recesses 12 are provided in the opposed wall portions 9 coaxially with the shaft holes 10 to surround inlet openings of the shaft holes 10 on the side of outer surfaces of the opposed wall portions 9. The recesses 12 open into the outer surfaces of the opposed wall portions 9.

Figure 4:
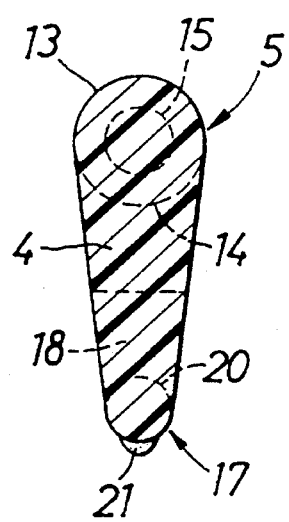
FIG. 4 is a sectional view taken along a line 4—4 in FIG. 3.

In each of the blades 5, the blade body 4 is provided, at opposite ends of a front edge 13 thereof, with a pair of projections 14 abutting against a pair of the bosses 11 and having the same outer diameter as such bosses 11. A pair of support shafts 15 are mounted on end faces of the projections 14, respectively to project therefrom coaxially with the projections 14. The support shafts 15 are rotatably fitted in the shaft holes 10 and have tip ends protruding outwardly from the outer surfaces of the opposed wall portions 9 and thus from the openings of the circular recesses 12, respectively. The front edge 13 of each of the blade body 4 is formed to have the same radius as that of the projection 14, as best shown in FIG. 4. Thus, such front edge 13 is continuous with both the projections 14 without creation of a step.

If a section around a mounting portion of each blade 5 is constructed in the above manner, each projection 14 and each boss 11 cannot be mismatched from each other, even if each blade 5 is rotated to any wind-direction adjusting position. Thus, it is possible to provide a good appearance to the section around the mounting portion. In addition, the area of contact between each blade 5 and the housing 3 is diminished by each boss 11 to reduce the rotational resistance of the blade 5 and therefore, each blade 5 can be rotated smoothly.

Each of the circular recesses 12 has been used to inhibit the formation of a flash on an outer peripheral surface of the support shaft 10 at a secondary injection step, but further has a function of avoiding an increase in thickness of the opposed wall portion 9 due to the provision of the boss 11 to prevent the deformation of the shaft hole 10 attendant on a delay of cooling of a portion around the boss 11 during the molding.

Figure 5:
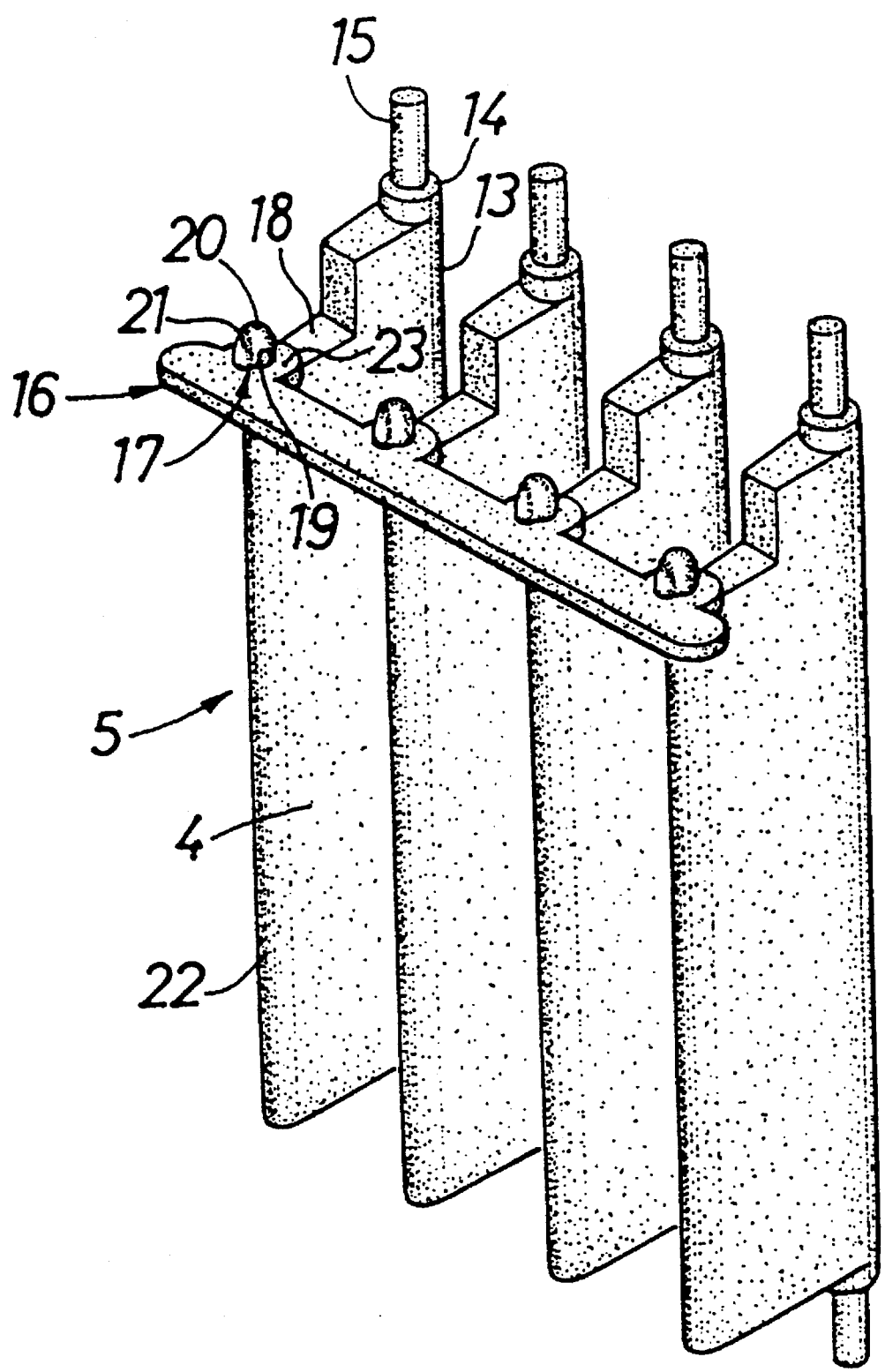
FIG. 5 is a perspective view illustrating the relationship between blades and an interlocking link.

The blades 5 are rotated in operative association with each other and for this purpose, each the blades 5 has a pivotally mounting portion 17 for an interlocking link 16. As shown in FIGS. 3 and 5, the pivotally mounting portion 17 is formed by a pivotal support shaft 20 projectingly provided at a common notched end 18 of each blade body 4 in parallel to the support shaft 15 to extend through the pivotal support hole 19 in the interlocking link 16, and a slip-off preventing projection 21 located at a projecting end of the pivotal support shaft 20 to engage an opening edge of the pivotal support hole 19. The slip-off preventing projection 21 protrudes outwardly of a rear edge 22 of the blade body 4 and is forcedly inserted through the pivotal support hole 19 in the interlocking link 16 by utilizing the elasticity of an annular portion 23 of the interlocking link 16. As clearly shown in FIGS. 1 and 2, an operating knob 24 is slidably mounted on one of the blade bodies 4 for sliding movement in a lengthwise direction of the blade body 4, so that vertical turning of the operating knob 24 causes the blades 5 to be rotated vertically through the interlocking link 16.

If the blow-out port device is constructed in the above manner, it is possible to contain the pivotally mounting portion 17, namely, the pivotal support shaft 20 and the slip-off preventing projection 21 within a range of the thickness of each blade 5 to reduce the spacing between the blades 5. Thus, it is possible to increase the number of blades 5, so that the adjustment of the direction of wind can be conducted as desired. In addition, in any rotated position of the blade 5, the pivotally mounting portion cannot be seen as protruding from on surface of the blade 5, leading to a good appearance.

As shown in FIGS. 1 and 2, another housing 25 made of synthetic resin is bonded to a rear end of the housing 3, and a plurality of blades 26 made of synthetic resin for adjusting the lateral direction of wind are mounted in the housing 25. A support shaft 27 for each of the blades 26 is rotatably supported, at its opposite ends, in upper and lower opposed wall portions 29 constituting a peripheral wall 28 of the housing 25. An interlocking link 30 is pivotally carried on the blades 26. The middle blade 26 has a corrugated portion 31 formed thereon, which is meshed with a corrugated portion 32 of the operating knob 24. Thus, when the operating knob 24 is slit in a lateral direction, the blades 26 are rotated to change the direction of wind to such direction.

A two-stage injection molding process for the above-described air-conditioning blow-out port device 1 will be described below. In this molding process, the housing 3 is molded at a primary injection step, and the blades 5 is molded at a secondary injection step by use of the shaft holes 10 in the housing 3 as a portion of each support shaft molding cavity.

FIGS. 6 to 11 illustrate a primary injection molding device 33 for use at the primary injection step of molding the housing 3. The molding device 33 includes a first opening-closing die 34, a second stationary die 35 opposed to the first die 34, and a plurality of (one pair, in the illustrated embodiment) first slide dies 36 clamped between both the die 34 and 35. The first slide dies 36 are slidably mounted in an opposed relation to each other on the second die 35 and each include a plurality of shaft hole shaping cores 37, and a plurality of circular projections 38, each of which has the core 37 protectingly provided on a portion of an end thereof, and is coaxial with the core 37.

First Step

Figure 6:
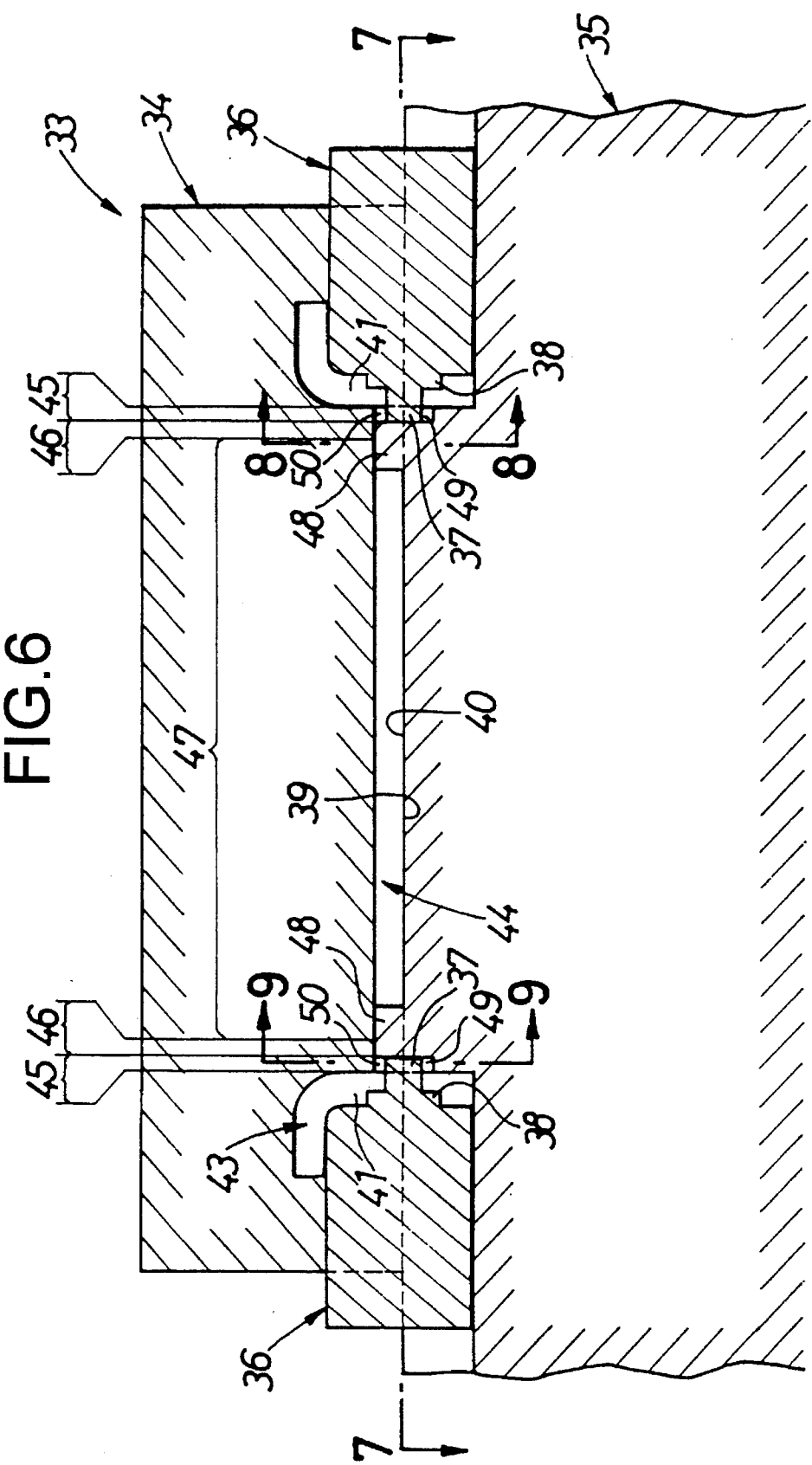
FIG. 6 is a vertical sectional view illustrating one example of a primary injection molding device, taken along a line 6—6 in FIG. 7.
Figure 7:
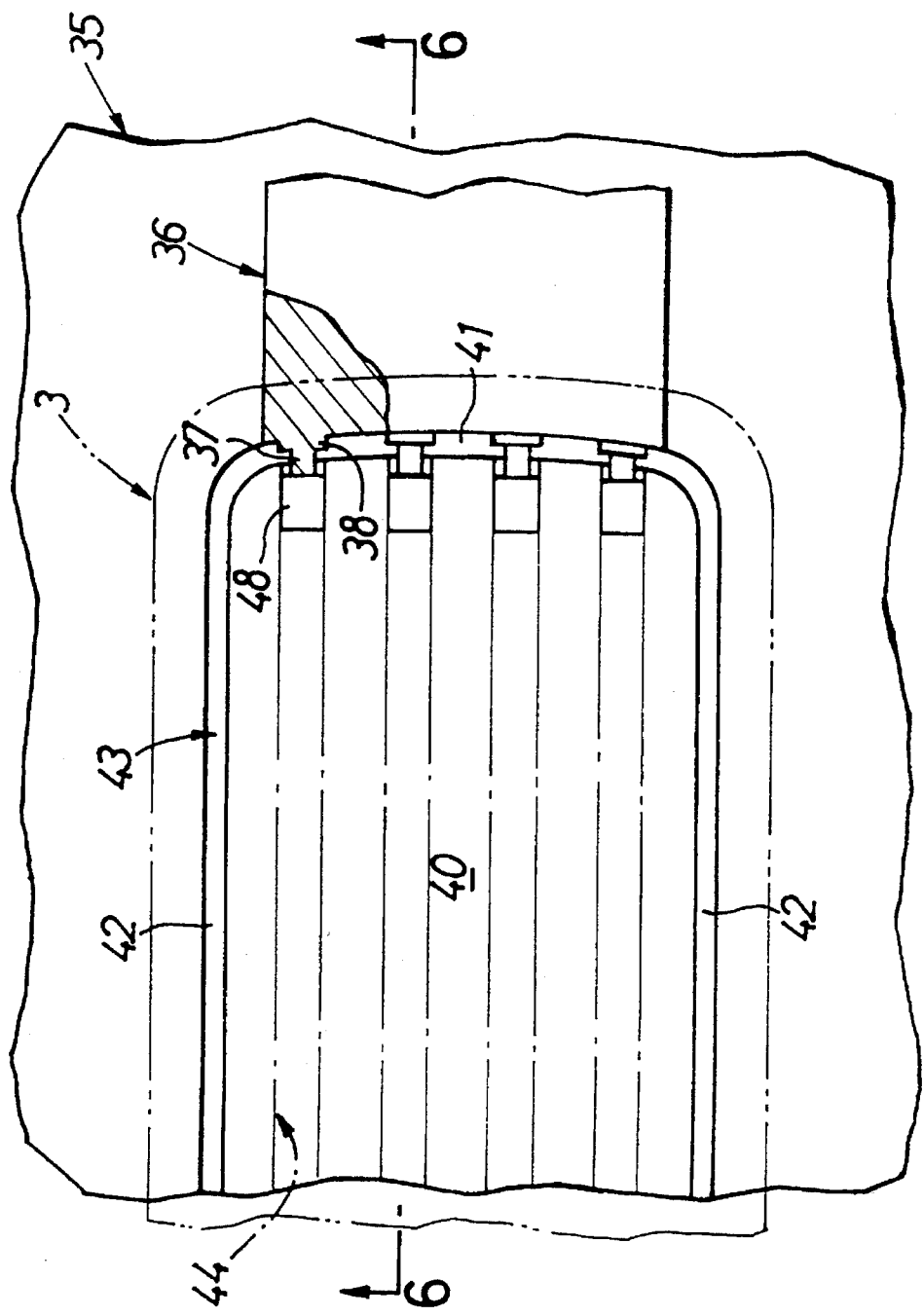
FIG. 7 is a view taken along a line 7—7 in FIG. 6.

As shown in FIGS. 6 and 7, the first opening-closing die 34 is lowered, and the opening-closing dies 34 and 35 are closed to clamp the pair of slide dies 36 therebetween.

This causes axes of the shaft hole shaping cores 37 of the first slide dies 36 to be matched with mating surfaces 39 and 40 of the dies 34 and 35, thereby defining the areas 41 corresponding to the pair of opposed wall portions and including the cores 37 and the projections 38, and the areas 42 corresponding to the pair of opposed wall portions and substantially perpendicular to the areas 41. The areas 41 and 42 form a first cavity 43 for forming the peripheral wall 6 and the front flange 7 of the housing 3.

The first die 34 has a plurality of recesses 44 each of which opens into the mating face 39 with opposite ends communicating with the first cavity 43. The opposite end portions of each of the first recesses 44 are boss-correspondence areas which are used to mold the half of the boss 11. A portion located inside each of the boss-correspondence areas is a projection-correspondence area 46 which is used to mold the half of the projection 14 of each blade 5. Further, a portion between both the boss-correspondence areas is a front edge-correspondence area 47 which is used to mold the front edge of each blade 5.

Figure 8:
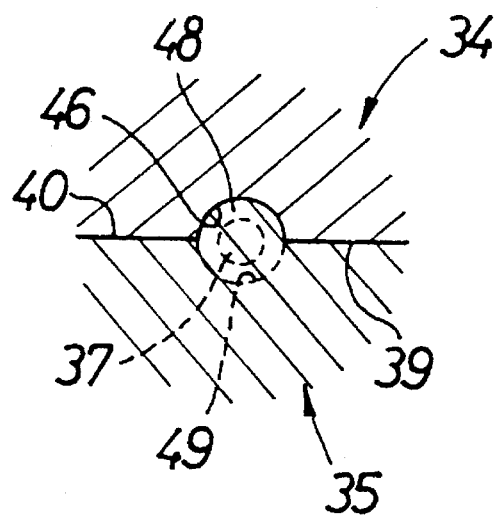
FIG. 8 is a sectional view taken along a line 8—8 in FIG. 6.

As shown in FIGS. 6, 7 and 8, a plurality, e.g., up to a pair, for every first recess 44 in the illustrated embodiment, of intercepting projections 48 semi-circular in section and provided on the mating face 40 of the second die 35 are fitted into the projection-correspondence areas 46 in the first recesses 44 simultaneously with the formation of the first cavity 43.

Figure 9:
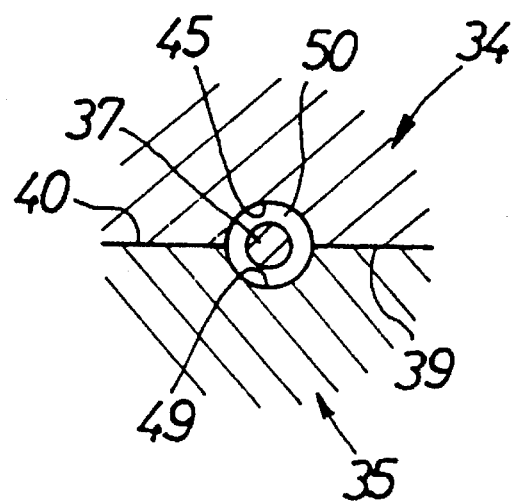
FIG. 9 is a sectional view taken along a line 9—9 in FIG. 6.

Thus, a plurality of second cavities 50 for molding the bosses 11 by cooperation with pairs of recesses 49 semi-circular section which open into the mating face 40 of the second die 35 and with the boss-correspondence areas 45 of the first recess 44, are defined around the tip ends of the shaft hole shaping cores 37 abutting against end faces of the intercepting projections 48, as shown in FIGS. 6, 7 and 9. Each of the second cavities 50 is in communication with the first cavity 43, but is cut off from communication with the front edge-correspondence area 47 of the first recess 44 by the intercepting projection 48.

Second Step

Figure 10:
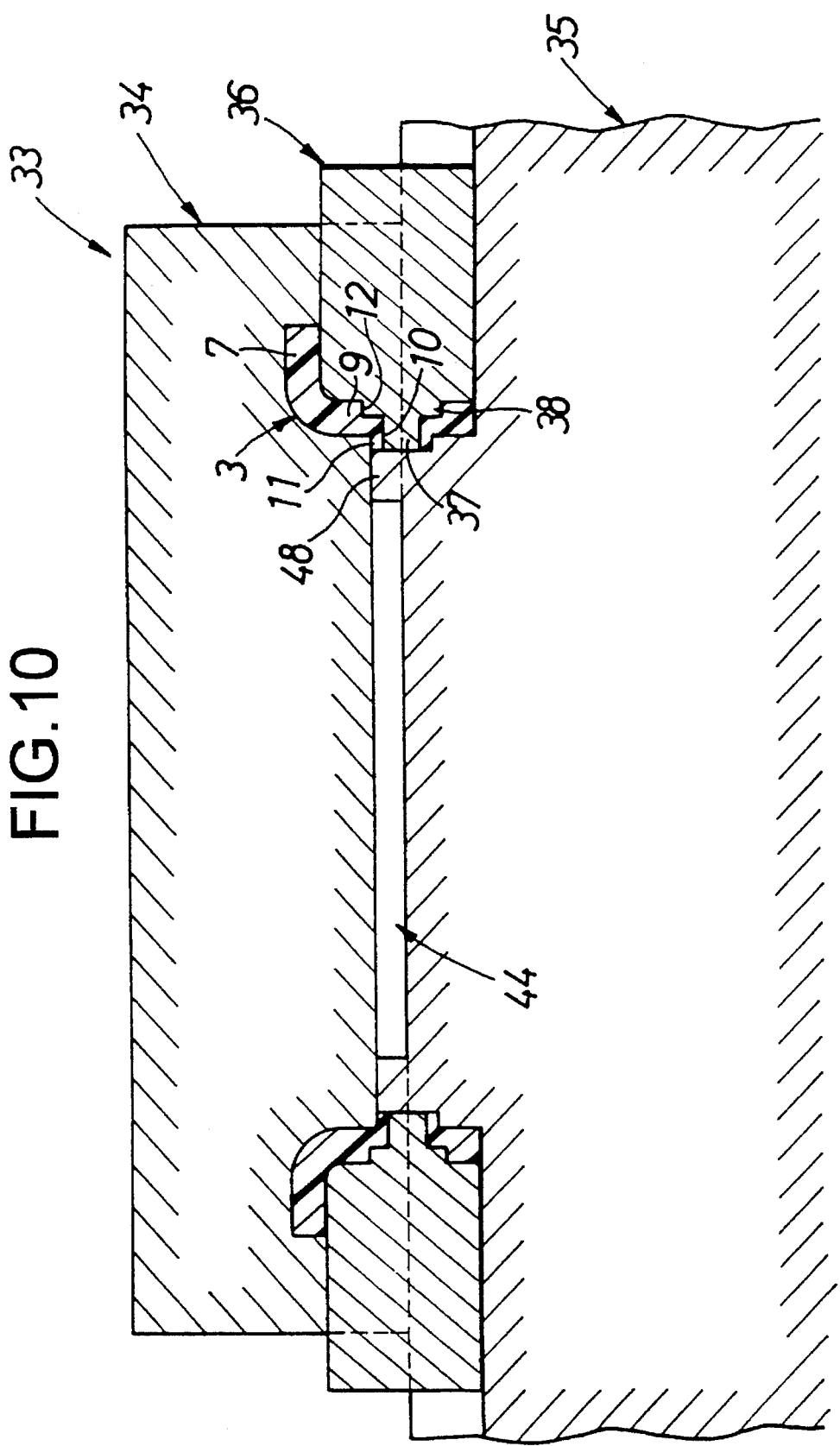
FIG. 10 is a vertical sectional view of the primary injection molding device shown in a condition in which a housing has been molded.
Figure 11:
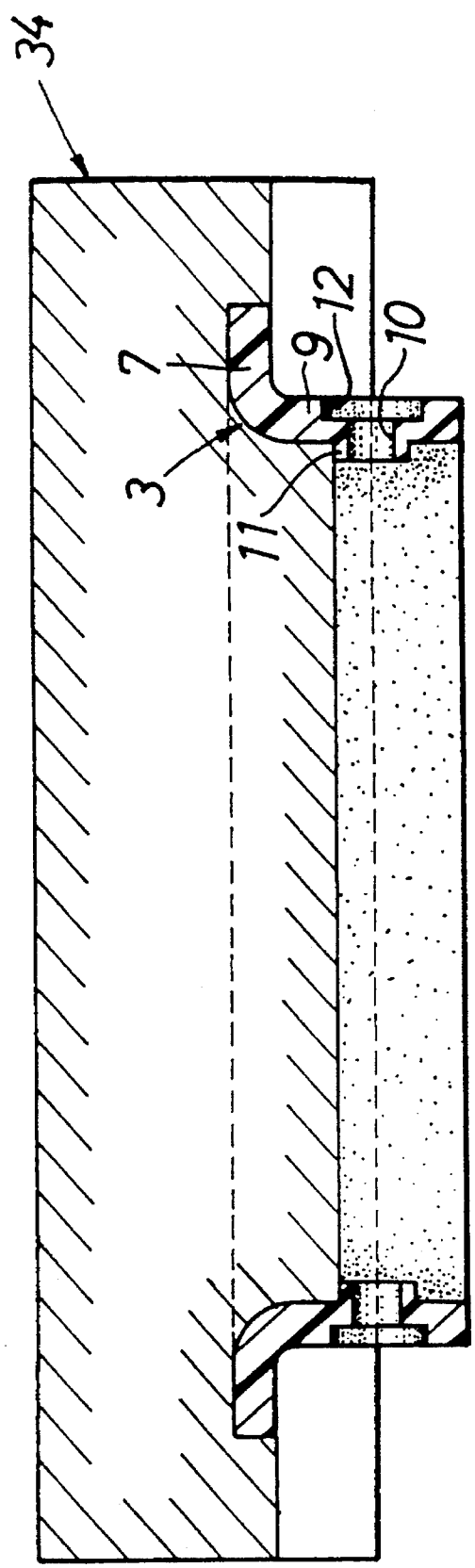
FIG. 11 is a vertical sectional view of a first die with the housing deposited thereto.

As shown in FIG. 10, a polypropylene (PP)-based resin as a synthetic resin injected through a gate (not shown) into the first cavity 43 and each of the second cavities 50 to form a housing 3. A plurality of circular recesses 12 surrounding openings of the shaft holes 10 at sides of the outer surfaces of the opposed walls are shaped by the projections 38. In this case, the boss 11 is clearly molded, because the projection-correspondence rears 46 of the first recesses 44 are closed by the intercepting projections 48.

Third Step

The slide dies 36 are retreated, so that the shaft hole shaping cores 37 and the projections 38 are withdrawn from the shaft holes 10 and the circular recesses 12. Then, the first die 34 moved upwardly, so that both the dies 34 and 35 are opened with the housing 3 left attached to the first die 34. In this case, the entire housing 3 including the bosses 11 is cooled uniformly and hence, a disadvantage of deformation of the shaft holes 10 cannot be produced.

The molding of the housing 3 is completed through the above-described steps.

FIGS. 12 to 17 illustrate a secondary injection molding device 51 for use at the secondary injection step of molding the blades 5. The molding device 51 includes a first die 34 also used as a third die, a fourth stationary die 52 opposed to the first die 34, and a plurality, e.g., a pair, in the illustrated embodiment, of slide dies 53 and 54 clamped between both the dies 34 and 522. The second slide dies 53 and 54 are slidably mounted in an opposed relation to each other and each have a plurality of circular projections 55 corresponding to a plurality of circular recesses 12 which open into the opposed wall portions 9 of the housing 3. A plurality of blind holes 56 are defined in the circular projections 55 for molding the support shafts 15 with their tip ends projecting from the opposed wall portions 9. One of the second slide dies 54 has a plurality of projection molding portions 57 for molding the notched common ends 18 of the blades 5.

Fourth Step

Figure 15:
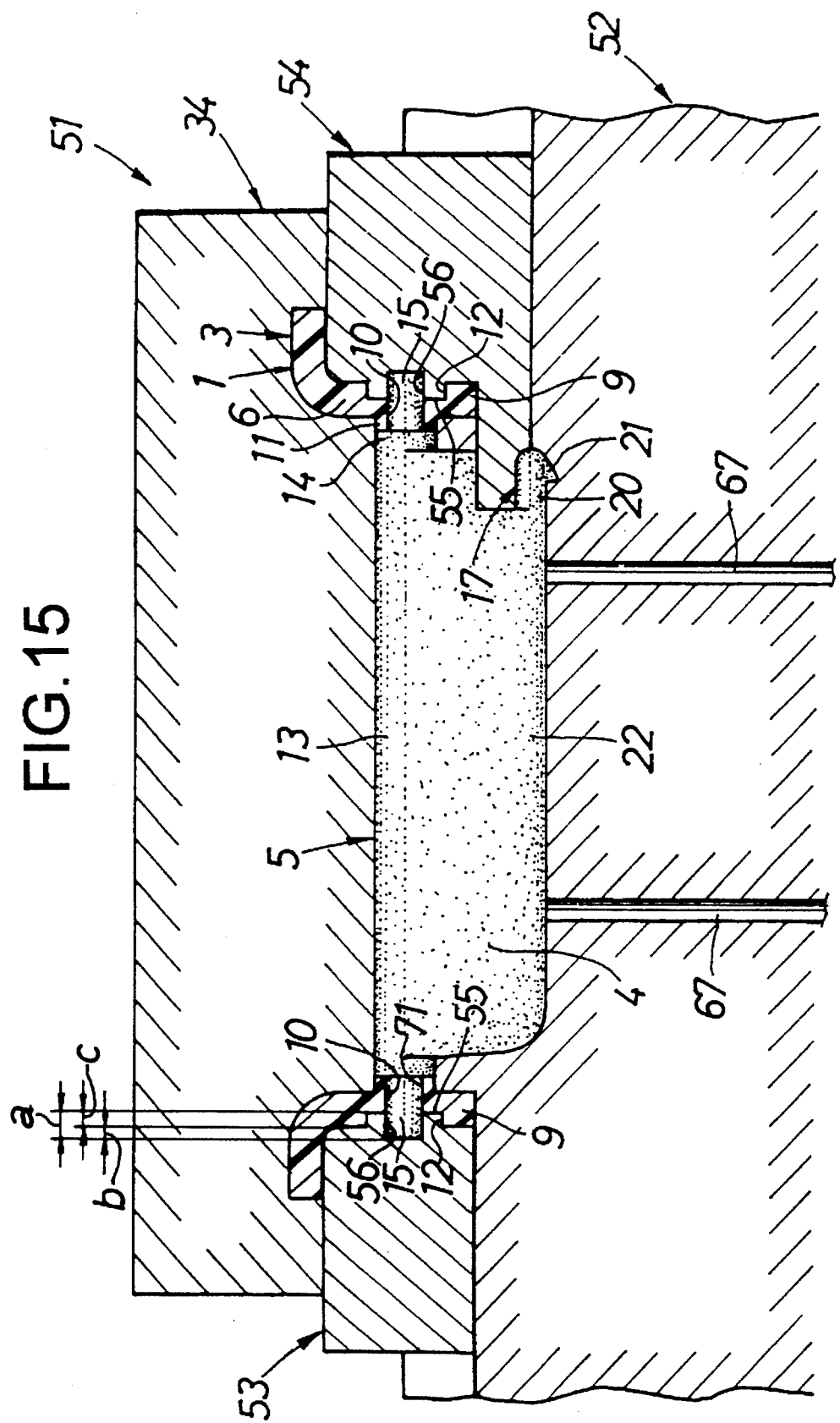
FIG. 15 is vertical sectional view of the secondary injection molding device shown in a condition in which a blow-out port device has been molded.
Figure 16:
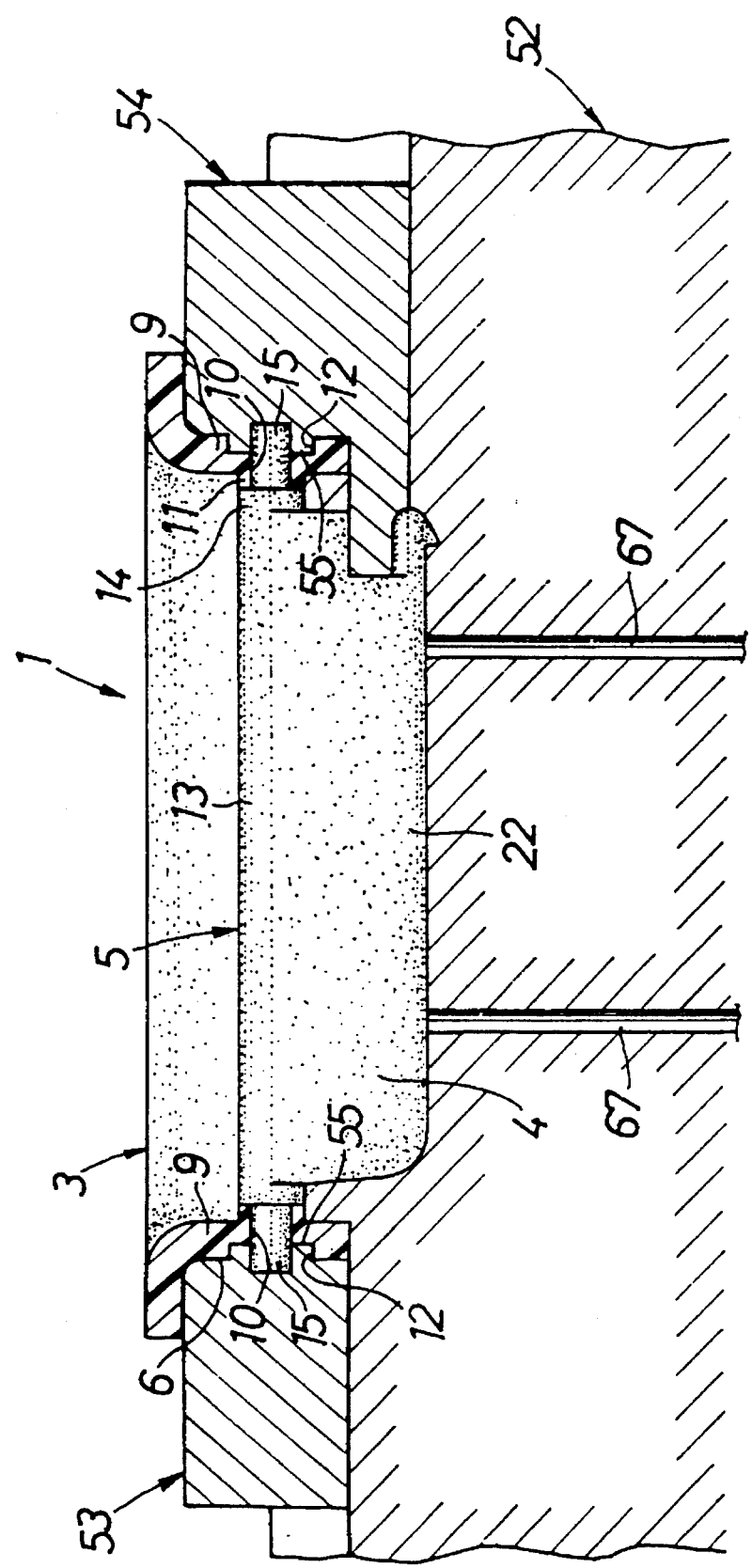
FIG. 16 is a vertical sectional view of the secondary injection molding device shown with the blow-out port device left on the fourth die.

As shown in FIGS. 122 to 15, the first die 34 is lowered, so that both the dies 34 and 52 are closed, and the pair of second slide dies 53 and 54 are clamped between both the dies 34 and 52.

Figure 12:
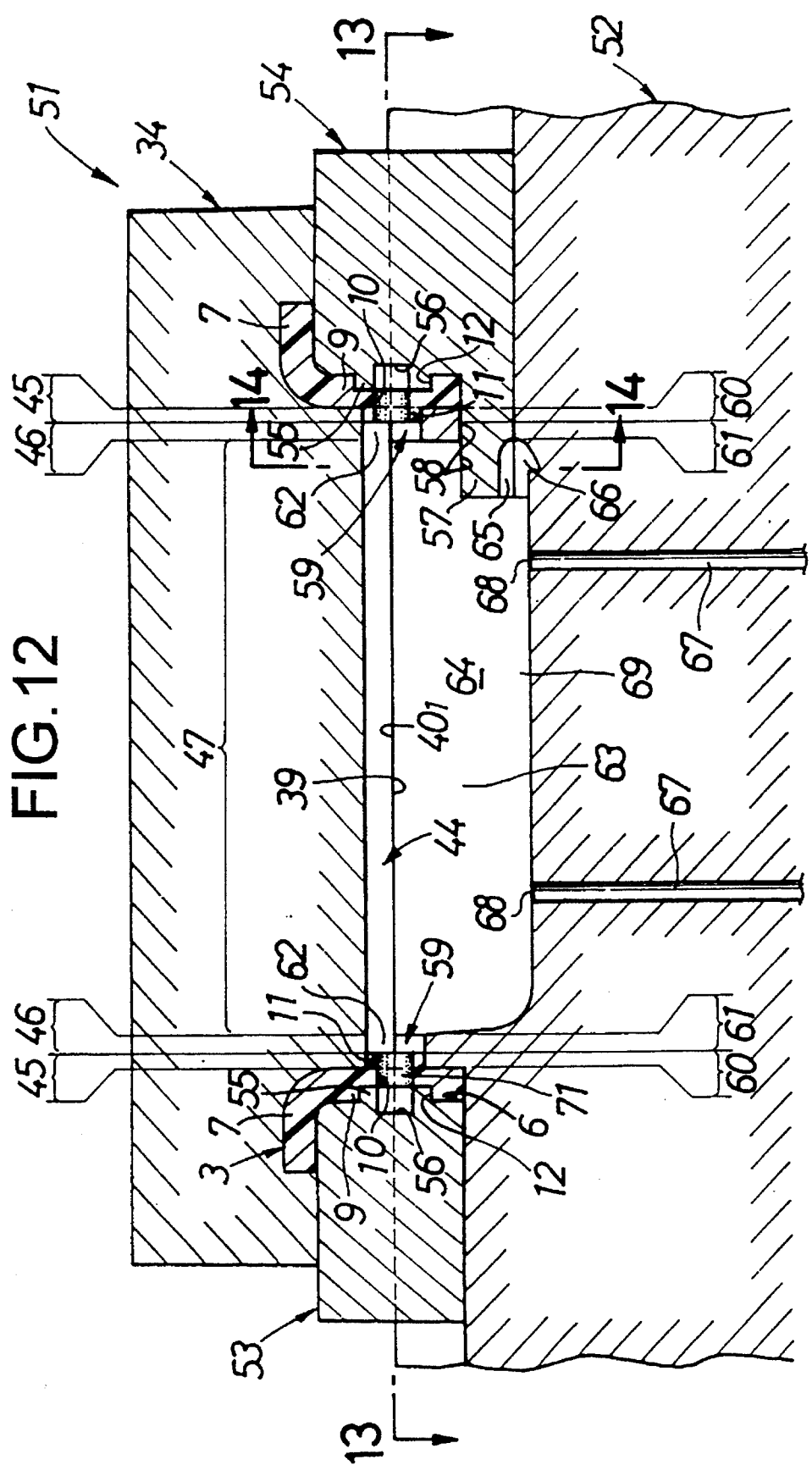
FIG. 12 is a vertical sectional view illustrating one example of a secondary injection molding device, taken along a line 12:12 in FIG. 13.
Figure 13:
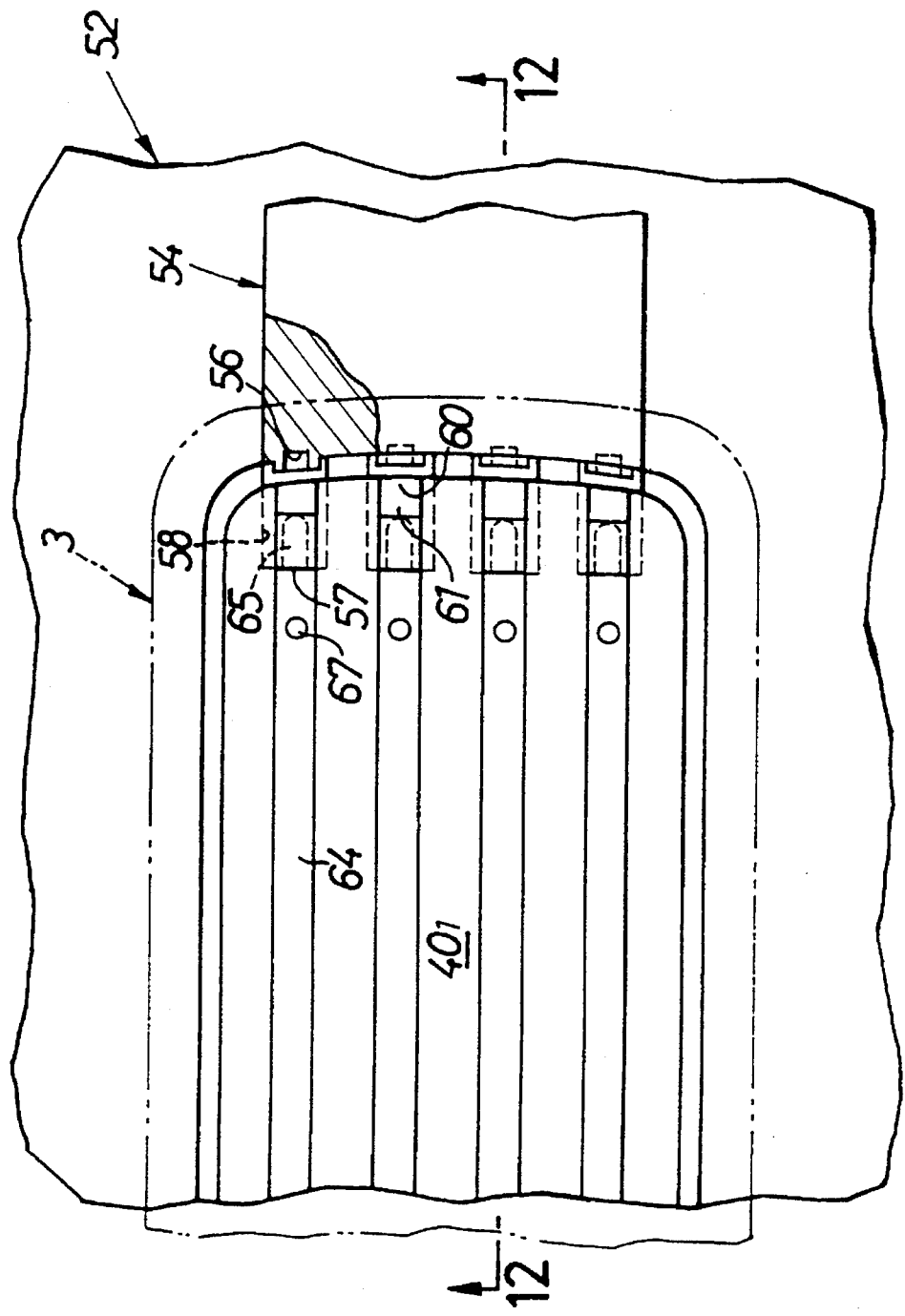
FIG. 13 is a view taken along a line 13—13 in FIG. 12.
Figure 14:
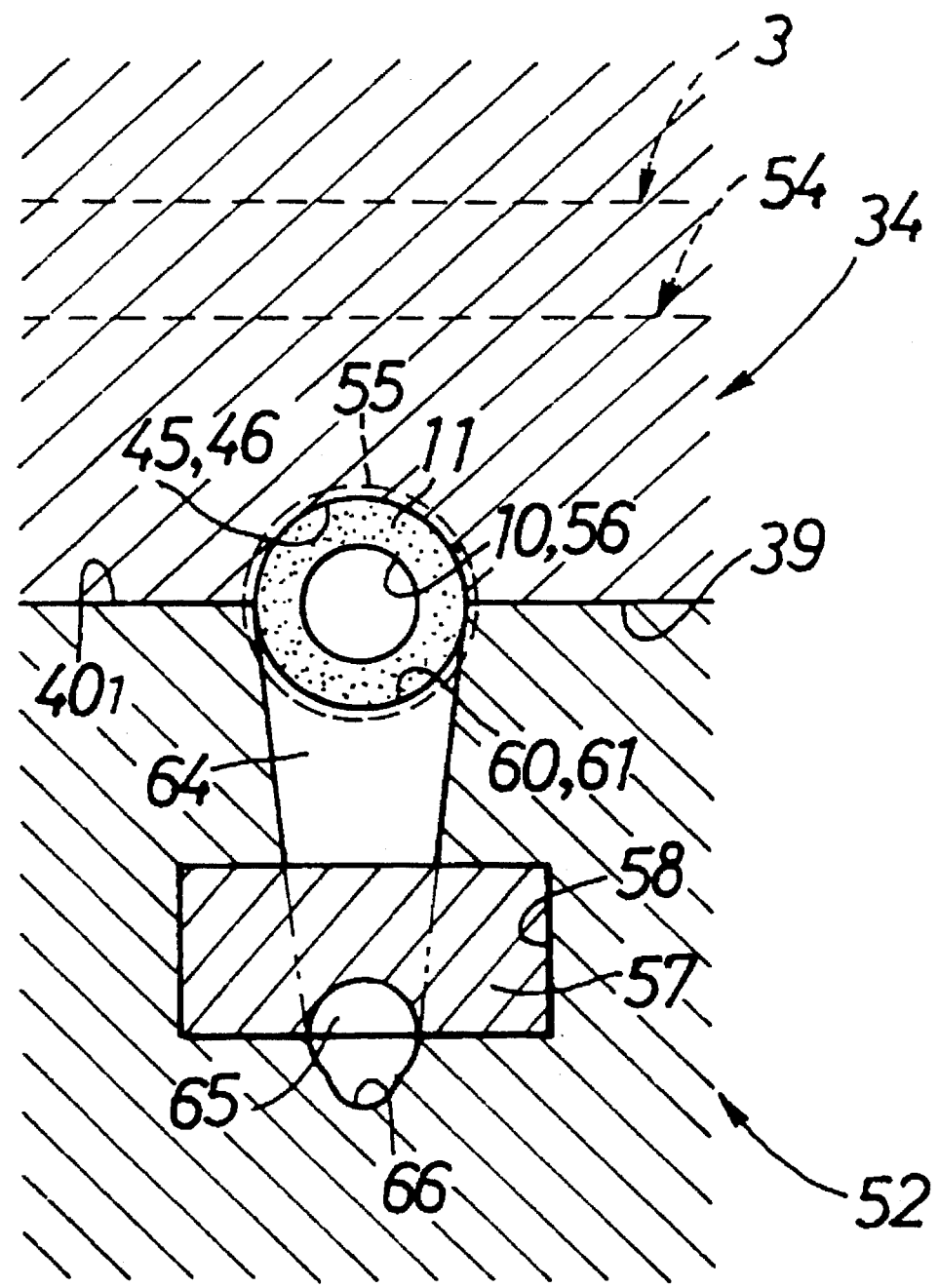
FIG. 14 is a sectional view taken along a line 14—14 in FIG. 12.

This causes the peripheral wall 6 and the front flange 7 of the housing 3 to be clamped between dies 34 and 52 and the second slide dies 53 and 54. In addition, as best shown in FIG. 12, the circular projections 55 of the second slide dies 53 and 54 are fitted into the circular recesses 12 with the blind holes 56 disposed in communicating and coaxially with the shaft holes 10. Further, as best shown in FIGS. 12 and 14, each of the molding portions 57 of the one slide die 54 extends through corresponding one of slide holes 58 in the fourth die 52.

The fourth die 52 has a plurality of second recesses 59 semi-circular in section and opposed to the recesses 44 of the first die 34, so that each boss 11 is clamped between boss-correspondence areas 45 and 60 of each of the first recesses 44 and each of the second recesses 59. A third cavity 62 for molding the projection 14 is defined between projection-correspondence areas 46 and 61 of each of the first recesses 44 and each of the second recesses 59 and disposed in communication and coaxially with each of the shaft holes 10.

A fourth cavity 71 for molding each of the support shafts 15 is defined by each of the blind holes 56 in the second slide dies 53 and 54 and by each of the shaft holes 10 communicating with such blind hole 56.

Further, a fifth cavity 64 for molding the blade body 4 is defined between the front edge-correspondence area 47 of each recess 44 in the first die 34 and each of deep recesses 63 which open into the mating face 40-1 between the second recesses 59 of the fourth die 52. The fifth cavities 64 are in communication with the third cavities 62.

A sixth cavity 65 for molding the pivotal support shaft 20 is defined each of the shaping portions 57 of the one second slide die 54 and a sliding surface of the fourth die 52, and a seventh cavity 66 is defined in the fourth die 52 for molding the slip-off preventing projection 21, and opens into the sixth cavity 65. In this way, the structures of the sixth and seventh cavities 65 and 66 are simplified in correspondence to the structure of the pivotally mounting portion 17.

The fourth die 52 is provided with a plurality of ejector pins 67 abutment surfaces of each pair of the ejector pins face a rear edge-correspondence area 69 for molding the rear edge of the blade body 4.

Fifth Step

As shown in FIG. 15, a polybutyleneterephthalate (PBT)-based resin as a synthetic resin is secondarily injected through the gate (not shown) into the third, fourth, fifth, sixth and seventh cavities 62, 71, 64, 65 and 66 to mold the blades 5, thereby producing a blow-out port device 1.

In this case, in each of the fourth cavities 71 for molding the support shafts 15, mating faces of the second slide dies 53 and 54 and the housing 3 are comprised of end faces of the circular projections 55 of the second slide dies 53 and 54 and a bottom surface of the circular recess 12 of the housing 3 and hence, the distance a between the mating surfaces and a bottom surface of the blind hole 56 is determined by a=b+c, wherein b represents such a distance in the prior art device having no circular recess 12, and c represents a depth of the circular recess 12. Consequently, the production of flashes on outer peripheral surfaces of the support shafts 15 is inhibited at the secondary injection step, because the pressure of the molten synthetic resin applied to the mating faces is lower than that in the prior art.

Each of the third cavities 62 for molding the projection 14 of each blade 5 and each of the bosses 11 are arranged coaxially with each other and hence, each of the projections 14 and each of the bosses 11 are molded coaxially with each other. Further, the primary and secondary injection steps are carried out by commonly using the first die 34 and therefore, it is possible to reduce the cost of the die and eliminate the cost and operating time required for the replacement of the die to enhance the mass-productivity of the blow-out port device 1.

Sixth Step

The first die 34 is lifted, so that both the dies 34 and 52 are opened, with a produced blow-out port device 1 being left on he fourth die 52 by fitting of the circular projections 55 of the second slide dies 53 and 54 in the circular recesses 12 in the housing 3.

Then, the second slide dies 53 and 54 are retreated so that the circular projections 55 are moved away from the circular recesses 12 of the housing 3, and the blind holes 56 are moved away from the tip ends of the support shafts 15. Thereafter, the ejector pins 67 are brought into abutment against the rear edges 22 of the blade bodies 4 to eject the blow-out port device 1 from the fourth die 52.

In releasing of the device from the die, the blades 5 are ejected by the corresponding ejector pins 67 and hence, a force of a degree for supporting the housing 3 is only applied to the support shafts 15. With this degree of the force, no damage is produced in the support shafts 15. In addition, an ejecting force is applied directly to the blades 5 which are deposited in close contact with the molding surface and therefore, the releasability of the blades 5 is good and thus, the blades 5 cannot be damaged.

Further, since the circular recesses 12 of the housing 3 are located in the opposed wall portions 9 which are disposed in the instrument pane 8, the appearance of the blow-out port device 1 cannot be injured. On the other hand, the ejector pin abutment portion of the each blade 5 is established at the rear edge of the blade 5 which is not visible from ahead of the device and therefore, the appearance of the blow-out port device cannot be likewise injured.

Figure 17:
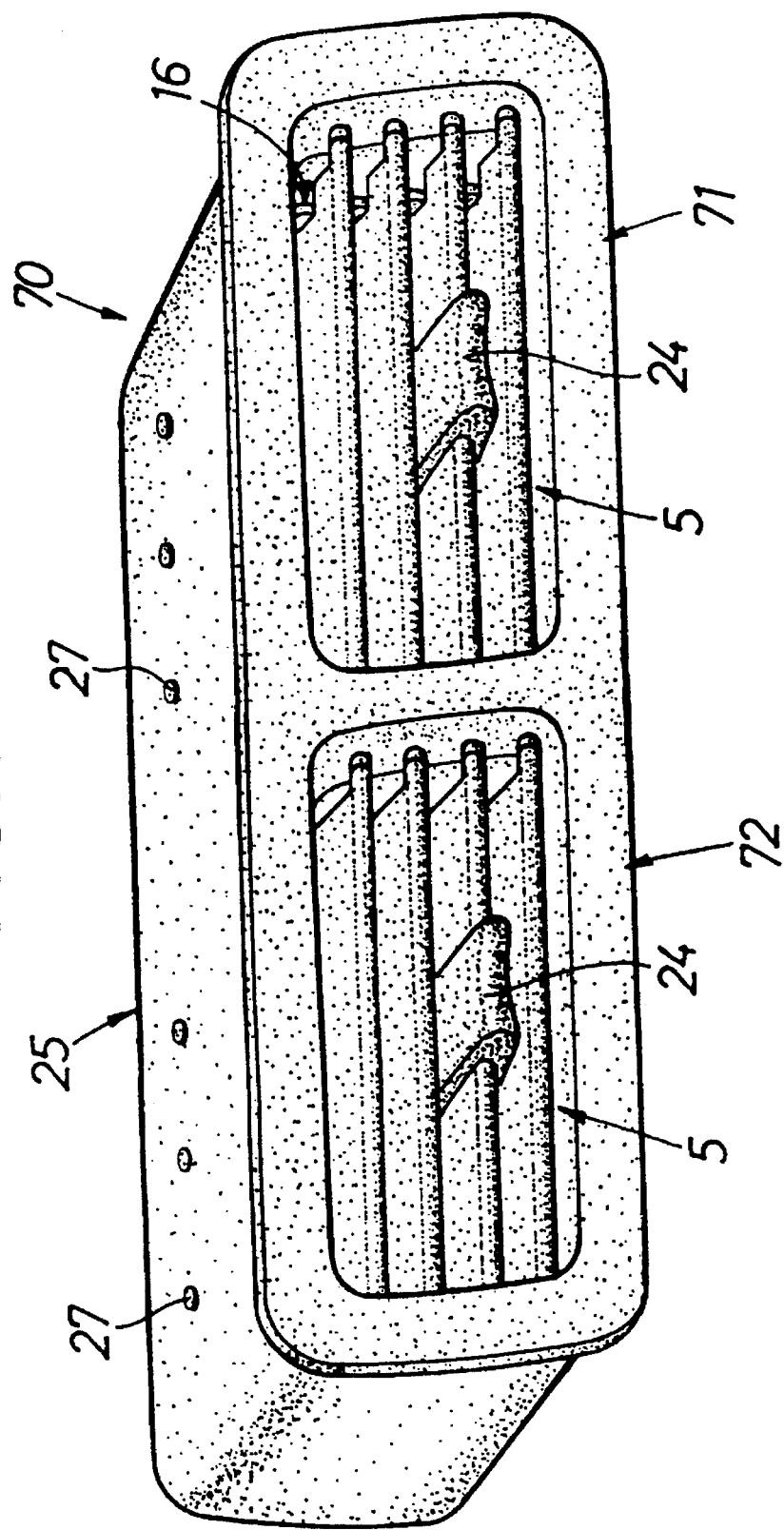
FIG. 17 is a perspective view of another example of an air conditioning blow-out port device.

FIG. 17 illustrates another example of an air-conditioning blow-out port device 70. The device 70 has a structure similar to that of the two blow-out port devices 1 arranged laterally. The above-described two stage injection molding process is applicable to the molding production of such a blow-out port device 70. In this case, the pivotally mounting portion 17 of the interlocking link 16 is provided at the right end of each blade 5 in a right blow-out port device structure 71 and at the left end of each blade 5 in a left blow-out port device structure 72.

What is claimed is:

1. An air conditioning blow-out port device comprising: a housing of synthetic resin formed at a primary injection step and having a peripheral wall including opposed wall portions; a plurality of pairs of shaft holes passed through said opposed wall portions in a coaxial arrangement; and a plurality of blades of synthetic resin formed at a second injection step and disposed within said housing and each having a blade body and a pair of support shafts which are projectingly provided coaxially on opposite end faces of said blade body and which are rotatably fitted into said shaft holes, with tip ends of the support shafts projecting from an outer surface of each of said opposed wall portions, wherein said opposed wall portions are provided with a plurality of pairs of bosses, which are located coaxially with the shaft holes to define inlet openings of said shaft holes at sides of inner surfaces of said opposed wall portions and to abut against the opposite end faces of said blade bodies, and said opposed wall portions are also provided with a plurality of pairs of recesses, which are located coaxially with the shaft holes and which open into outer surfaces of said opposed wall portions to surround the inlet openings of the shaft holes at sides of the outer surfaces of the opposed wall portions, wherein said recesses are a sufficient depth to inhibit the formation of a flash on an outer peripheral surface of the support shaft at the secondary injection step and to avoid an increase in thickness of the opposed wall portions due to the provision of said bosses, and wherein said support shafts have a generally constant cross sectional width along the length thereof.

2. A process for producing an air conditioning blow-out port device by a two-stage injection molding using a synthetic resin, said air conditioning blow-out port device comprising: a housing of synthetic resin having a plurality of pairs of shaft holes provided in a coaxial arrangement in opposite wall portions of a peripheral wall to extend through the opposed wall portions, and a plurality of pairs of bosses located coaxially with the shaft holes to define inlet openings of the shaft holes at sides of inner surfaces of the opposed wall portions; and a plurality of blades each having a blade body disposed within said housing with opposite end faces thereof abutting against the bosses, respectively, and a pair of support shafts which have a generally constant cross-sectional width along a length thereof an which are projectingly provided coaxially on the opposite end faces of each of said blade bodies and which are rotatably fitted into the shaft holes, the support shafts each having tip ends thereof projecting from an outer surface of each of the opposed wall portions; said process comprising the steps of:

closing first and second opposed opening-closing dies, while at the same time, clamping between both said opening-closing dies a plurality of first opposed slide dies including a plurality of shaft hole shaping cores (37) and a plurality of projections (38) each having a respective one of the cores projectingly provided on a portion of an end face thereof, thereby defining a cavity for molding the housing such that said shaft hole shaping cores and said projections are included;

primarily injecting a synthetic resin into said cavity to mole said housing which includes a plurality of recesses (12) shaped by the projections (38) to open into the outer surfaces of said opposed wall portions and to surround inlet openings of said shaft holes at sides of the outer surfaces of the opposed wall portions;

closing third and fourth opening-closing dies to clamp said housing by said third and fourth opening-closing dies, and clamping between said third and fourth opening-closing dies a plurality of second slide dies opposed to one another in a manner to fit projections (55) of the second slide dies into said recesses and to put blind holes (56) of the second slide dies opening into the end faces of the projections into communication with said shaft holes, thereby defining a plurality of first cavities which mold said support shafts by said blind holes and said shaft holes communicating with said blind holes, while at the same time, defining a plurality of second cavities which mold said blade bodies between the first opposed cavities; and secondarily injecting a synthetic resin into said first and second cavities to mold said blades.

3. The process as set forth in claim 2, wherein one of said first and second opening-closing dies used in said plurality injecting step is also used as one of said third and fourth opening-closing dies in said secondarily injecting step.

4. A process for producing an air conditioning blow-out port device by a two-stage injection molding using a synthetic resin, said air conditioning blow-out port device comprising: a housing having a peripheral wall including opposed wall portions; a plurality of pairs of shaft holes passed through said opposed wall portions in a coaxial arrangement; and a plurality of blades each having a blade body and a pair of support shafts which have a generally constant cross sectional width along a length thereof and which are projectingly provided coaxially on opposite end faces of said blade boy disposed within said housing and which are rotatably fitted into said shaft holes, the support shafts each having tip ends thereof projecting from an outer surface of each of said opposed wall portions; said process comprising the steps of:

closing first and second opposed opening-closing dies, while at the same time, clamping between both said opening-closing dies a plurality of first opposed slide dies including a plurality of shaft hole shaping cores (37) and a plurality of projections (38) each having a respective one of the cores (37) projectingly provided on a portion of an end face thereof, thereby defining a cavity for molding the housing such that said shaft hole shaping cores and said projections are included;

primarily injecting a synthetic resin into said cavity to mole said housing which includes a plurality of recesses shaped by the projections to open into the outer surfaces of said opposed wall portions and to surround inlet openings of said shaft holes at sides of the outer surfaces of the opposed wall portions;

closing third and fourth opening-closing dies to clamp said housing by said third and fourth opening-closing dies and clamping between said third and fourth opening-closing dies a plurality of second slide dies opposed to one another in a manner to fit projections thereof (55) into said recesses and to put blind holes thereof (56) opening into the end faces of the projections into communication with said shaft holes, thereby defining a plurality of first cavities which mold said support shafts by said blind holes and said shaft holes communicating with said blind holes, while at the same time, defining a plurality of second cavities which mold said blade bodies between the first opposed cavities; and secondarily injecting a synthetic resin into said first and second cavities to mole said blades.

5. The process as set forth in claim 4, wherein one of said first and second opening-closing dies used in said primarily injecting step is also used as one of said third and fourth opening-closing dies in said secondarily injecting step.

* * * * *